3,278,238
THRUST SUPPORT FOR MINING MACHINE
CUTTER BAR
Jerry Karlovsky, Jr., Nashville, and Earl C. Michael, Hoyleton, Ill., assignors to National Mine Service Company, Pittsburgh, Pa., a corporation of West Virginia
Filed July 3, 1964, Ser. No. 380,178
4 Claims. (Cl. 299—59)

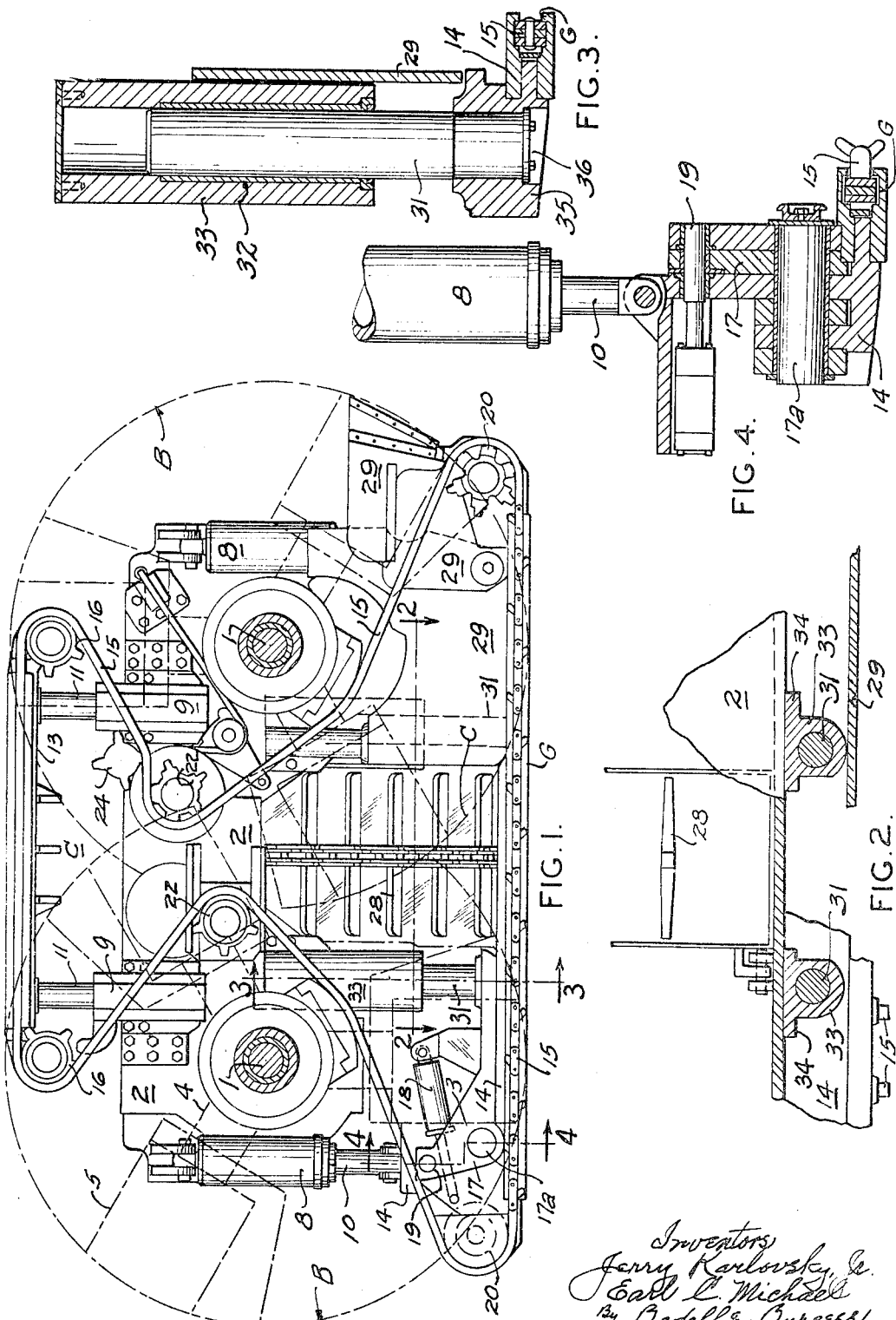

The invention relates to a continuous mining machine of the type in which framing, mounted upon traction wheels or treads, carries a gear case which journals a pair of boring shafts extending longitudinally of the frame and spaced apart transversely of the frame with their forward ends carrying radial rotating arms with cutters producing near cylindrical cuts into a mine seam against which the machine is driven. A continuous cutting chain extending transversely of the machine behind the rotating arms moves along upper and lower cutter bars. The lower cutter bar may include extension devices at its ends. A chain conveyor extends from the middle lower cutter bar rearwardly and upwardly toward the rear of the machine. As the machine moves forwardly the lower portion of the cutter chain is forced into the cusps between the near cylindrical bores and the lower end of the conveyor receives the material which has been cut by the boring bars and by the chain. Suitable hydraulic, or other mechanisms at the sides of the machine are manually controlled and operated to raise and lower the lower cutter bar to accommodate different boring and cutting conditions and to clear the ground when the machine is moving from place to place and is not engaged in a boring operation.

The main object of the present invention is to transmit the thrust exerted against the lower cutter bar, by the forward movement of the machine into a seam, to the machine frame independently of the mechanism used to raise and lower the cutter bar. With this arrangement the mechanisms for supporting the cutter bar can be positioned near the sides of the machine and outboard of the main rotating boring shafts where they are accessible for maintenance operations. The heavy but relatively simple longitudinal thrust-resisting structure may be positioned adjacent to the conveyor inboard of the rotary cutter shafts and out of the way of the same and cutter bar supporting and extension devices which are readily accessible for maintenance.

In the accompanying drawing illustrating the invention:

FIG. 1 is a front view of a continuous mining machine with endless cutter chain and associated structure relating to the present invention. Parts of the machine are removed for better illustration as indicated by the sectioning of the boring shafts and the indication of their cutter arms in broken lines.

FIG. 2 is a horizontal section on line 2—2 of FIG. 1.

FIGS. 3 and 4 are detail vertical sections on corresponding lines 3—3 and 4—4 of FIG. 1 and are drawn to a larger scale.

The continuous miner is of the type having parallel boring bars or shafts 1 extending lengthwise of the machine and journaled in a gear case 2 extending across the front of the machine and carried by framing (not shown) mounted on endless tracks or other carriage structure indicated at 3 as are in common use in such machines. Arms 4 radiating from boring bars 1 carry cutter heads 5 and the cutters thereon bore into the seam as the machine advances and produces substantially cylindrical bores B with cusps C between them.

Upright hydraulic cylinders 8, 9, carried on gear case 2 near the sides of the machine, have pistons 10, 11 respectively which mount the upper and lower cutter or trimmer bars 13, 14 respectively, each extending transversely of the machine and lower bar 14 includes a guide G receiving the lower horizontal flight of an endless cutter chain 15. Sprockets 16 are journaled on the ends of upper cutter bar 13. A cutter bar extension 17 at each end of lower cutter bar 14 is pivoted on the cutter bar by a pin 17a and is swung to projected and retracted positions by a hydraulic cylinder and piston unit 18 mounted on the cutter bar, there being a lock pin 19 through the cutter bar and the extension for securing the latter in projected position. Sprockets 20 are journaled on extensions 17. Units 18 function independently of cylinders 8 and pistons 10 and do not adjust the cutter bar 14. Cutter chain 15 passes over idler sprockets 16 and 20 on the cutter bars, a drive sprocket 22, journaled on gear case 2, and hydraulically actuated take-up sprockets 24 adjustably mounted on the gear case. A conveyor 28 leads rearwardly and upwardly from lower cutter bar 14 intermediate the ends of the latter. At the sides of the conveyor throat is upright pusher plate structure 29 which guides loose cut material into the conveyor chute, and forms the subject matter of another application, filed July 3, 1964, Serial No. 380,157.

The machine advances into a seam under heavy pressure applied particularly to the lower reach of the cutter chain and to cutter bar 14. This thrust is transmitted from lower cutter bar 14 direct to the gear case through heavy upright thrust rods 31 freely slidable vertically in guides 33 mounted on the gear case adjacent to the sides of the conveyor and inboard of boring shafts 1 and cylinders 8. Each guide comprises an upright cylinder 33 with a liner 32 and with flat rear flanges 34 bolted to the gear case. Rods 31 are slidable vertically in the cylinders and each has a shouldered lower end received in a foot 35 carried by the cutter bar 14 and secured to the rod by a detachable disk 36.

As pistons 10 are actuated to shift lower cutter bar 14 vertically, rods 31 move vertically in cylinders 33, but in any adjusted position the thrust on cutter bar 14 or pusher plates 29 is transmitted to the gear case and machine frame independently of the cutter bar raising and lowering mechanisms, hence there is no undue horizontal pressure on the latter or on their supporting brackets 38 on the ends of the gear case. The spacing of the guides inwardly from the cutter bar support mechanism and the extension actuating mechanism improves the access to these mechanisms for inspection, maintenance and repair and facilitates the positioning of the cutter bar support structure near the extreme ends of the gear case and this avoids stripping the rotary cutter arms and associated structure from the machine when access to the cutter bar mechanism is required.

The details of the structure may be varied substantially without departing from tht spirit of the invention and the exxclusive use of those modifications coming within the scope of the claims is contemplated.

What is claimed is:

1. In a continuous mining machine, ground traction means, superstructure carried thereby, rotary shafts with radial cutter arms journaled in the superstructure and rotating in a plane traversing the front of the machine, a lower cutter chain bar near the bottom of the machine adjacent the lower sweep of said cutter arms and extending from side to side of the machine, vertically disposed fluid pressure cylinders and pistons connected to said superstructure near the sides of the machine and to the end portions of said bar for raising and lowering said bar, laterally spaced thrust-resisting members each having a free vertically sliding mounting on the superstructure between said cylinders and pistons and the longitudinal center of the machine and secured directly to said bar and movable therewith and transmitting horizontal thrust from said cutter bar direct to the superstructure independently of said fluid pressure cylinders and pistons.

2. In a continuous mining machine, ground traction means, a superstructure including a gear case, a transverse cutter bar adjacent the bottom of the machine in front of said gear case, members mouned to slide freely vertically on said gear case adjacent the longitudinal center line of the machine but spaced apart to accommodate a conveyor between them and transmitting horizontal thrust applied to said cutter bar lengthwise of the machine directly to said superstructure, and vertically adjustable pressure fluid supports for said cutter bar mounted on the gear case adjacent the sides of the machine.

3. In a continuous mining machine, ground traction mechanism, superstructure carried thereby, rotary cutter shafts extending longitudinally of the machine at opposite sides of the machine longitudinal center line and journaled in said superstructure, a longtiudinal conveyor extending from the central lower forward part of the machine upwardly and rearwardly, thrust resisting devices freely slidable vertically on the front of the machine superstructure and positioned between each rotary shaft and the conveyor, a cutter chain bar directly connected to said devices, and mechanisms positioned outboard of the rotary shafts transversely of the machine and mounted on said superstructure and connected to said bar for elevating and lowering said bar and said devices.

4. In a continuous mining machine, ground traction means, a main frame carried thereby, a gear case mounted on said main frame, boring shafts disposed lengthwise of the machine and journaled in said gear case, a transverse cutter bar adjacent the bottom of the machine near the forward end thereof, a conveyor extending along the longitudinal center line of the machine upwardly and rearwardly from said cutter bar, upright guides fixed on the gear case at the sides of the conveyor, upright thrust rods freely slidable on said guides and extending downwardly below said gear case and connected to and supported by said cutter bar and transmitting horizontal thrusts on said cutter bar to said gear case, and vertically adjustable hydraulic cylinder and piston members mounted on the gear case adjacent the sides of the machine and directly supporting the end portions of said cutter bar independently of said thrust rods.

References Cited by the Examiner

UNITED STATES PATENTS

| | | | |
|---|---|---|---|
| 2,776,125 | 1/1957 | Robbins et al. | 299—59 |
| 3,041,054 | 6/1962 | Ball | 299—59 X |
| 3,086,762 | 4/1963 | Bergmann | 299—59 |

ERNEST R. PURSER, *Primary Examiner.*